US011350803B2

(12) United States Patent
Hall et al.

(10) Patent No.: US 11,350,803 B2
(45) Date of Patent: Jun. 7, 2022

(54) TOILET WITH USER WEIGHT-DRIVEN SEAT LIFT PROFILE

(71) Applicant: Hall Labs, LLC, Provo, UT (US)

(72) Inventors: David R. Hall, Provo, UT (US); David Crismon, Herriman, UT (US)

(73) Assignee: Medic, Inc., Provo, UT (US)

( * ) Notice: Subject to any disclaimer, the term of this patent is extended or adjusted under 35 U.S.C. 154(b) by 10 days.

(21) Appl. No.: 16/814,065

(22) Filed: Mar. 10, 2020

(65) Prior Publication Data
US 2020/0390299 A1    Dec. 17, 2020

Related U.S. Application Data

(63) Continuation-in-part of application No. 16/709,549, filed on Dec. 10, 2019.

(60) Provisional application No. 62/907,408, filed on Oct. 9, 2019, provisional application No. 62/907,432, filed on Sep. 27, 2019, provisional application No. 62/888,683, filed on Aug. 19, 2019, provisional application No. 62/862,564, filed on Jun. 17, 2019, provisional application No. 62/862,299, filed on Jun. 17, 2019.

(51) Int. Cl.
*A47K 13/10* (2006.01)
*G01G 19/50* (2006.01)
*A47K 13/24* (2006.01)
*A47K 17/02* (2006.01)

(52) U.S. Cl.
CPC ............ *A47K 13/105* (2013.01); *A47K 13/24* (2013.01); *A47K 17/028* (2013.01); *G01G 19/50* (2013.01)

(58) Field of Classification Search
CPC . A47K 13/10–105; A61G 5/14; A61G 7/1007
See application file for complete search history.

(56) References Cited

U.S. PATENT DOCUMENTS 6,745,417 B2 * 6/2004 Sumino .................. A47K 13/10
4/222
6,754,917 B1 * 6/2004 Rhoades .............. A61G 7/1007
4/667

(Continued)

FOREIGN PATENT DOCUMENTS

FR 2519861 * 7/1983 ................ A61G 5/14

*Primary Examiner* — David P Angwin
*Assistant Examiner* — Nicholas A Ros

(57) ABSTRACT

A toilet comprising a frame; a bowl supported by the frame; a seat also supported by the frame; a shroud covering the frame; a lift mechanism supported by the frame for adjusting the position of the seat; a foot platform positioned to support the feet of a user sitting on the seat wherein the foot platform comprises a plurality of foot platform weight sensors; a plurality of seat weight sensors between the frame and the seat for measuring the weight of a user on the seat; and a controller receiving data from the plurality of foot platform weight sensors and from the plurality of seat weight sensors; wherein the controller uses the data from the foot platform weight sensors to calculate the weight distribution of the user between the seat and foot platform; and wherein the controller uses the data from the foot platform weight sensors to calculate the weight distribution of the user between the left and right side of the foot platform; and wherein the controller uses the calculated weight distributions to control the at least one lift mechanism is disclosed.

17 Claims, 20 Drawing Sheets

(56) References Cited

U.S. PATENT DOCUMENTS

| | | | | |
|---|---|---|---|---|
| 7,051,383 B1* | 5/2006 | Paz | ................... | A61G 7/1007 |
| | | | | 4/246.1 |
| 8,336,130 B1* | 12/2012 | Cardenas | ............... | A47K 13/10 |
| | | | | 4/667 |
| 9,595,185 B1* | 3/2017 | Hall | ......................... | E03D 9/00 |
| 9,770,144 B2* | 9/2017 | Rife | ......................... | A61G 5/14 |
| 10,428,508 B1* | 10/2019 | Hudson | ................... | E03D 11/16 |
| 10,835,088 B2* | 11/2020 | Song | ....................... | A61G 5/14 |
| 2007/0132292 A1* | 6/2007 | Robertson | .............. | A47C 7/506 |
| | | | | 297/330 |
| 2017/0258652 A1* | 9/2017 | Latham | ................. | A47C 11/00 |
| 2018/0084959 A1* | 3/2018 | Hall | ...................... | G16H 40/63 |

* cited by examiner

TOILET WITH USER WEIGHT-DRIVEN SEAT LIFT PROFILE

CROSS-REFERENCE TO RELATED APPLICATIONS

This application is a Continuation-in-Part of U.S. application Ser. No. 16/709,549 filed on Dec. 10, 2019. This application also claims priority to U.S. Provisional Application No. 62/862,299 titled "Body Weight Scale Taking Standing and Sitting Weight Readings" filed on Jun. 17, 2019; 62/862,564 titled "Toilet with Frame, Bowl and Shroud" filed on Jun. 17, 2019; 62/888,683 titled "Toilet with Multiple Point Lifting System" filed Aug. 19, 2019; 62/907,408 titled "Toilet with Personalized Lifting System for Bowl and Seat" filed on Oct. 9, 2019; and 62/907,432 titled "Toilet with User Weight Driven Seat Lift Profile" filed on Sep. 27, 2019, each of which is incorporated herein by reference in their entireties.

TECHNICAL FIELD

The present disclosure relates to toilets. More particularly, it relates to smart toilets equipped to assist users in sitting and/or rising from the toilet.

BACKGROUND

There is a large population of physically disabled, overweight, and/or aging people that have a difficult time getting on and off a toilet. The solutions on the market right now are either a raised toilet seat, which can be very messy and hard to clean, or a motorized seat that lifts a person to the standing position. These are usually large and cumbersome around the toilet and risk dumping a person off the seat before they are on their feet.

Not all people have the same height or body dimensions. However, nearly all toilets come in only a very small variety of heights. This can make it particularly difficult or uncomfortable for those who are among the tallest and shortest, or more specifically those with the longest and shortest legs, to lower down, sit, or rise from the toilet seat. Conventional toilets also lack any way to adjust the height of the feet. Raising the feet can only be accomplished with stools, typically having a fixed height.

The ability to track an individual's health and wellness is currently limited to the lack of available data related to personal health. Many diagnostic tools are based on examination and testing of excreta, but the high cost of frequent doctor's visits and/or scans make these options available only on a very limited and infrequent basis. Thus, they are not widely available to people interested in tracking their own personal wellbeing.

Toilets present a fertile environment for locating a variety of useful sensors to detect, analyze, and track trends for multiple health conditions. Locating sensors in such a location allows for passive observation and tracking on a regular basis of daily visits without the necessity of visiting a medical clinic for collection of samples and data. Monitoring trends over time of health conditions supports continual wellness monitoring and maintenance rather than waiting for symptoms to appear and become severe enough to motivate a person to seek care. At that point, preventative care may be eliminated as an option leaving only more intrusive and potentially less effective curative treatments. An ounce of prevention is worth a pound of cure.

Just a few examples of smart toilets and other bathroom devices can be seen in the following U.S. Patents and Published Applications: U.S. Pat. No. 9,867,513, entitled "Medical Toilet With User Authentication"; U.S. Pat. No. 10,123,784, entitled "In Situ Specimen Collection Receptacle In A Toilet And Being In Communication With A Spectral Analyzer"; U.S. Pat. No. 10,273,674, entitled "Toilet Bowl For Separating Fecal Matter And Urine For Collection And Analysis"; US 2016/0000378, entitled "Human Health Property Monitoring System"; US 2018/0020984, entitled "Method Of Monitoring Health While Using A Toilet"; US 2018/0055488, entitled "Toilet Volatile Organic Compound Analysis System For Urine"; US 2018/0078191, entitled "Medical Toilet For Collecting And Analyzing Multiple Metrics"; US 2018/0140284, entitled "Medical Toilet With User Customized Health Metric Validation System"; US 2018/0165417, entitled "Bathroom Telemedicine Station"; U.S. Ser. No. 15/222,267, entitled "THIN WEIGHT SCALE." The disclosures of all these patents and applications are incorporated by reference in their entireties.

SUMMARY

In a first aspect, the disclosure provides a toilet comprising a frame; a bowl supported by the frame; a seat also supported by the frame; a shroud covering the frame; a lift mechanism supported by the frame for adjusting the position of the seat; a foot platform positioned to support the feet of a user sitting on the seat wherein the foot platform comprises a plurality of foot platform weight sensors; a plurality of seat weight sensors between the frame and the seat for measuring the weight of a user on the seat; and a controller receiving data from the plurality of foot platform weight sensors and from the plurality of seat weight sensors; wherein the controller uses the data from the foot platform weight sensors to calculate the weight distribution of the user between the seat and foot platform; and wherein the controller uses the data from the foot platform weight sensors to calculate the weight distribution of the user between the left and right side of the foot platform; and wherein the controller uses the calculated weight distributions to control the at least one lift mechanism.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
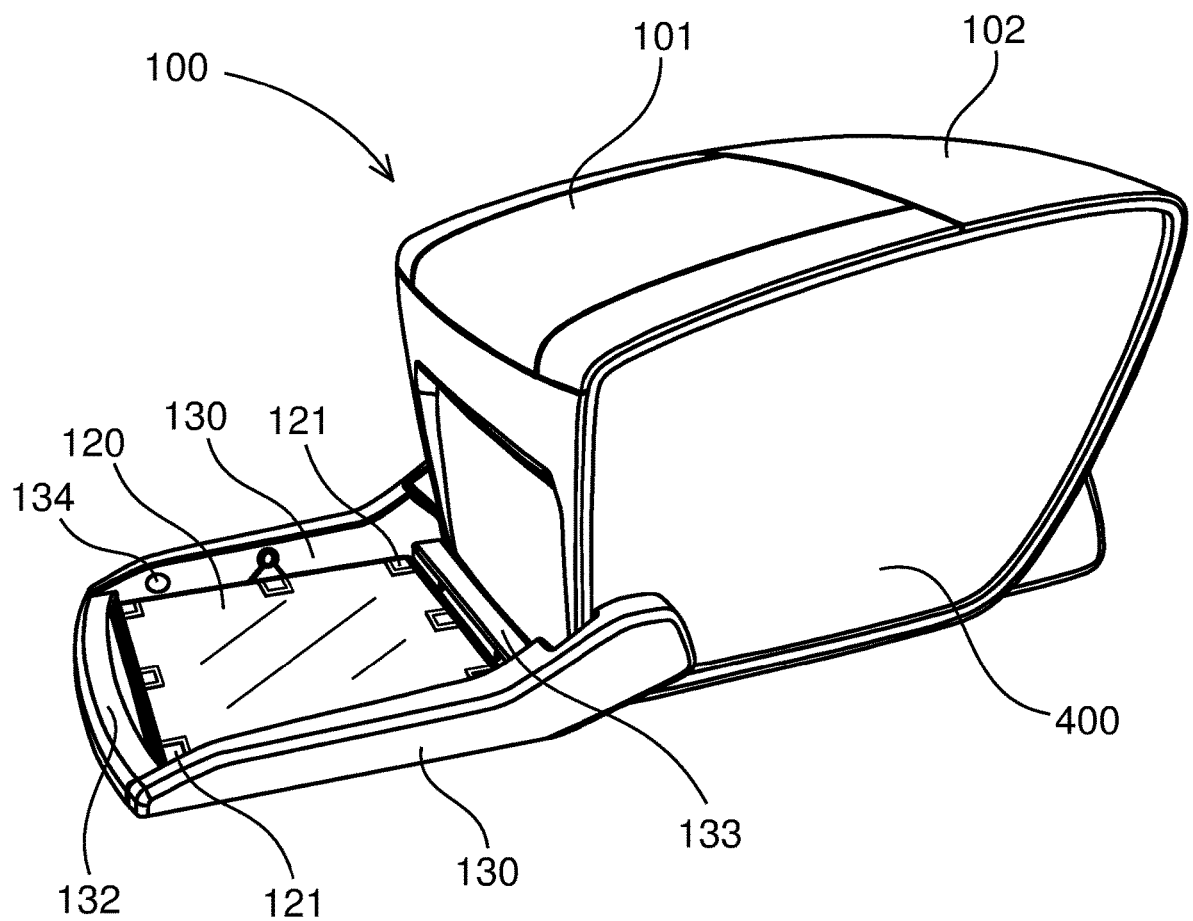
FIG. 1 is a perspective view of a first exemplary toilet according to the present disclosure in a closed position.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "excreta" refers to any substance released from the body including urine, feces, menstrual discharge, and anything contained or excreted therewith.

As used herein, the term "toilet" is meant to refer to any device or system for receiving human excreta, including urinals.

As used herein, the term "bowl" is meant to refer to the portion of a toilet that is designed to receive excreta.

As used herein, the term "frame" refers to the portion of the toilet below and around the bowl supporting it, the seat, and any other toilet components.

As used herein, the term "shroud" is meant to refer to the outer surface of the toilet enclosing and covering the frame and typically other toilet components.

As used herein, the term "actuator" is intended to have a relatively broad meaning, referring to any mechanical device for moving the seat. Various types of actuators are suitable for use in the invention. The preferred actuators use hydraulic or pneumatic cylinders. Alternatively, the actuators use screws, levers, or some other mechanism to raise and lower the seat.

As used herein, the term "processor" is meant to refer to logic circuitry that processes data from the sensors, applies algorithms such as computer vision to identify a user or determine physical characteristics of a user, and instructs a digital controller to adjust the toilet seat and/or bowl position based on the preferences of a known user or characteristics of an unknown (i.e., unidentified) user.

As used herein, the term "position," as in the position of the bowl, seat or footrest, is intended to refer to the height and/or the angle of the device, with respect to the floor.

As used herein, the term "angle," as in angle of the seat, is intended to refer to the angle of the seat versus the horizontal floor (i.e., 0° angle) so that increasing the angle refers to the seat approaching perpendicular (i.e., 90° angle).

As used herein, the term "weight" is meant to refer to the mass of a user or their excreta.

As used herein, the term "floating" refers to a component that is supported by weight sensors independently of other components and does not support other components (e.g., a floating bowl does not support the weight of the seat).

As used herein, the term "removable" refers to any portion of the shroud that can be moved to allow access to the interior components of the toilet whether such portion is detached from the toilet or merely moved (e.g., slid over or pivoted on one or more hinges) to provide access.

Exemplary Embodiments

The present disclosure relates to a toilet with a bowl and seat supported by a frame. The frame includes one or more lifting mechanisms adapted to raise and lower the seat and/or bowl. In some embodiments, there may be separate frames for supporting and adjusting the seat and for supporting and adjusting the bowl. Preferably, the lifting mechanism is further adapted to change the angle of the seat.

In a preferred embodiment, the toilet comprises a motorized seat lift that is integral with and internal to the toilet. It also provides customized lifting motions set to individual users' preferences. The disclosed toilet looks and feels like a conventional toilet and can help prevent fall by keeping a person more supported during a lift and help them to their feet at a height appropriate for the individual.

In a preferred embodiment, the adjustable frame allows the toilet to be both shorter and taller than conventional toilets. This makes the toilet more comfortable and easier to use for both tall and short users, including children, without the need for special stools or spacers.

In various exemplary embodiments, the bowl is supported by a frame including at least one actuator. In various exemplary embodiments, the seat is supported a frame comprising at least one actuator. In various exemplary embodiments, the frame comprises two, three, four, or more actuators for the bowl and/or seat. In a more preferred embodiment, the frame comprises three pairs of actuators to move the seat. Preferably, the actuators are controlled by a digital controller that coordinates the actions of the actuators to thereby provide a smooth lifting and lower at the desired speed. More preferably, the controller is programmable, so that users can program the lifting and lowering of the seat to their preference. Even more preferably, the toilet includes a user identification module, so that the user is automatically identified as he or she approaches or sits on the toilet.

Figure 2:
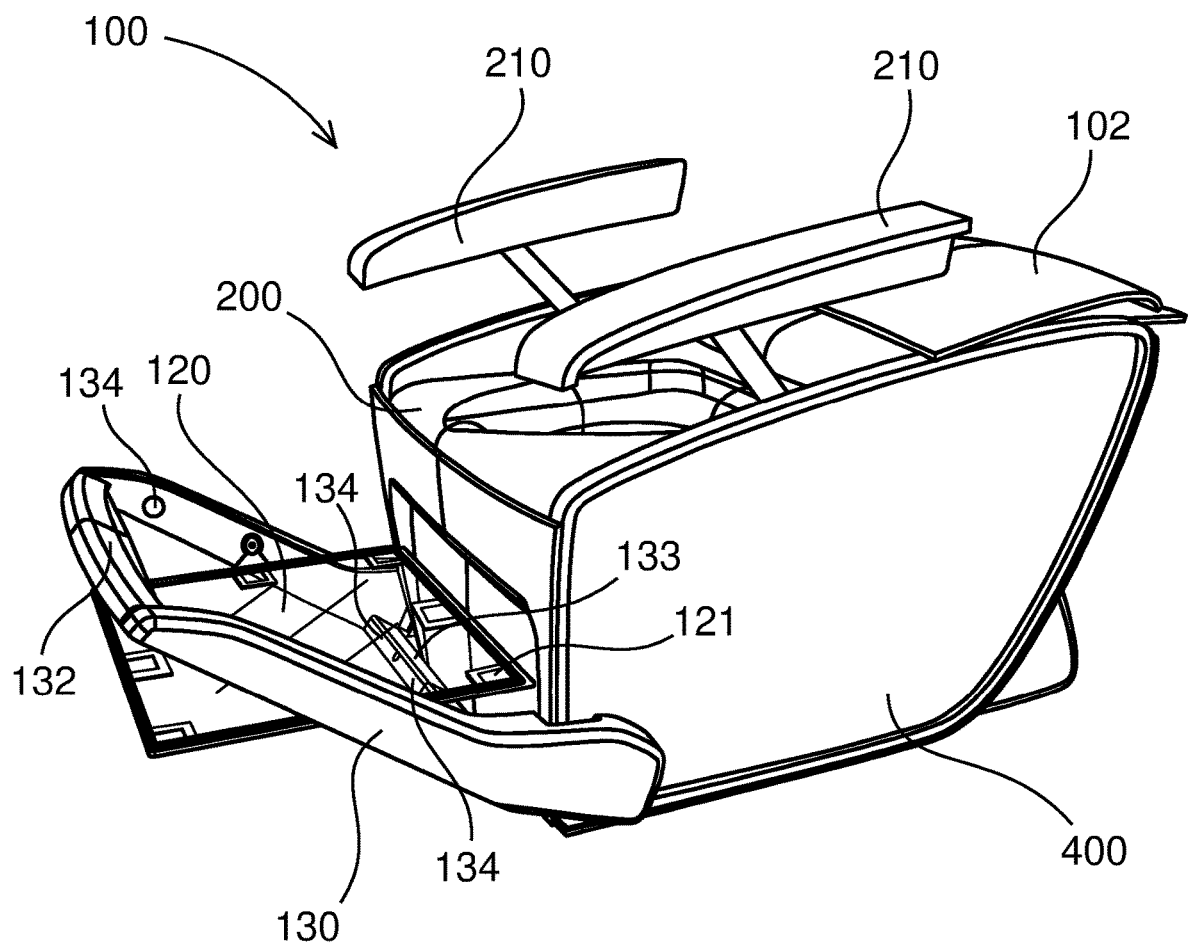
FIG. 2 is a perspective view of the toilet of FIG. 1 with the lid open and an exemplary embodiment of handles deployed.

Referring to FIG. 1, an exemplary embodiment of a toilet is shown with a closed lid 101, lowered foot platform 120, and retracted armrests and handles 210. FIG. 2 shows the toilet with an open lid 101, raised foot platform 120, and extended armrests and handles 210. In a preferred embodiment, handles 210 are adapted to be readily ripped by a user, especially while sitting or rising. In a preferred embodiment, the armrests and handles 210 move while the seat 200 is lowering and lifting a user to enable them to grip the armrests and handles 210 and use them for support during sitting and rising. The toilet is enclosed with a shroud 400.

In various exemplary embodiments, the shroud 400 covers all the internal support components that comprise the frame as well as the bowl 300. In preferred embodiments, the shroud 400 comprises one or more sections of articulated or flexible (e.g. elastic, material) assembled such that the shroud 400 can contract or expand as the frame 110 moves the bowl 300 and/or seat 200. Other sections of the shroud may be rigid. In various exemplary embodiments, the at least some portions of the shroud are removable or openable to allow access to the interior of the toilet frame. The interior of the toilet frame may include, among other things, plumbing connections, fluid supply lines, support structures, health and wellness assessment devices, electronic circuits, digital devices (e.g., processors, memory), storage tanks, and communication modules.

In various exemplary embodiments, the shrouds 400 are preferably designed for aesthetic and other purposes. For example, the shrouds 400 can be made in various colors to suit the décor of the bathroom the toilet is installed in. Besides colors, the shrouds 400 can include patterns or graphics so that the toilet 100 "makes a statement" in the bathroom.

In various exemplary embodiments, the armrests and handles 210 include one or more buttons, switches, sensors, etc. through which the user may control the seat, including, but not limited to, starting and stopping the seat 200, reversing seat movement direction, adjusting the position or angle of the seat 200, and adjusting the height of the bowl 300, seat 200, or foot platform 120.

In various exemplary embodiments, the armrests and handles 210 may include one or more health and wellness sensors. The sensors 211 may be used to measure how hard the user is gripping and provide feedback to the lift control. For example, if a user suddenly increases their grip it is likely that they are struggling with standing or with their balance. Grip pressure may also be tracked over time. The sensors may also include detection for heart rate, body temperature, hand health indicators, cameras, electrocardiogram, pulse, blood test (e.g., using a finger prick), etc. Toilet handles with health and wellness sensors are disclosed in U.S. Patent Pub. No. 2018/0084959, the entire disclosure of which is incorporated herein by reference in its entirety.

In various exemplary embodiments, the armrests and handles are supported by one or more weight sensors that measure the weight of the user that is being placed on the armrests. The weight on each armrest and handle is measured separately from the other.

Referring to FIGS. 3 to 6, an exemplary embodiment of a toilet 100 is shown with various seat elevations. The toilet 100 includes a frame 110, bowl 300 supported by the frame 110, a lid 101, and a seat 200 also supported by the frame 110. In a preferred embodiment, the seat 200 is supported by two sets actuators 111, 112, and 113. In other embodiments, the number and arrangement of actuators may vary.

In a preferred embodiment, a pair of first actuators 111 are pivotally connected to a front area of the seat 200 and a pair of second actuators 112 are pivotally connected to a back area of the seat 200 providing support at four "corners" of the seat 200. The four actuators 111 and 112 are also pivotally attached to the frame 110. An additional pair of third actuators 113 are pivotally attached to the frame 110 at one end and pivotally attached to the second pair of seat actuators 112 at their other end. In another embodiment, the third actuators 113 are attached to the first pair of actuations 111.

Figure 3:
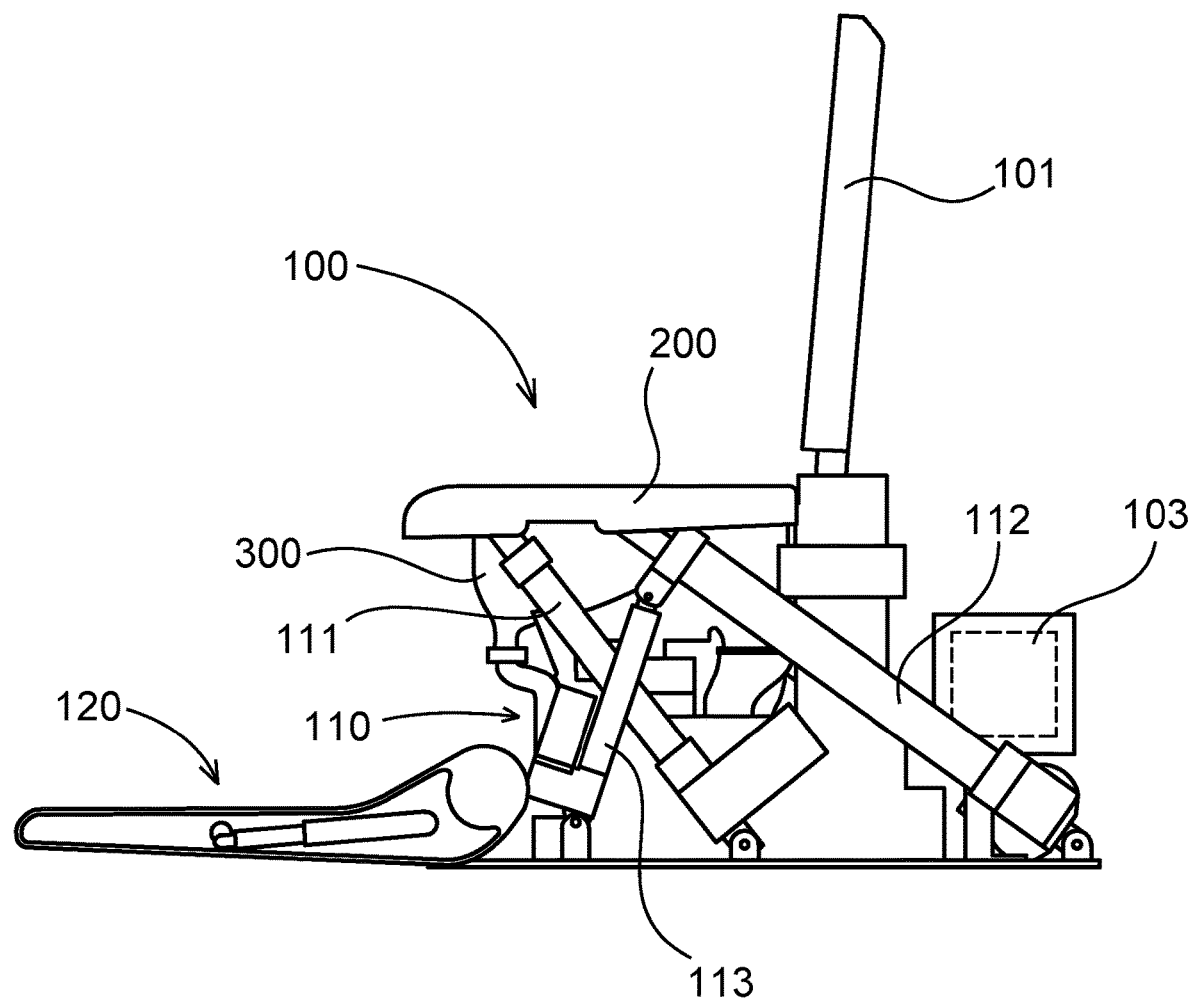
FIG. 3 is a side plan view of a second exemplary toilet according to the present disclosure with the shroud removed and the seat in a lowered position for sitting.
Figure 4:
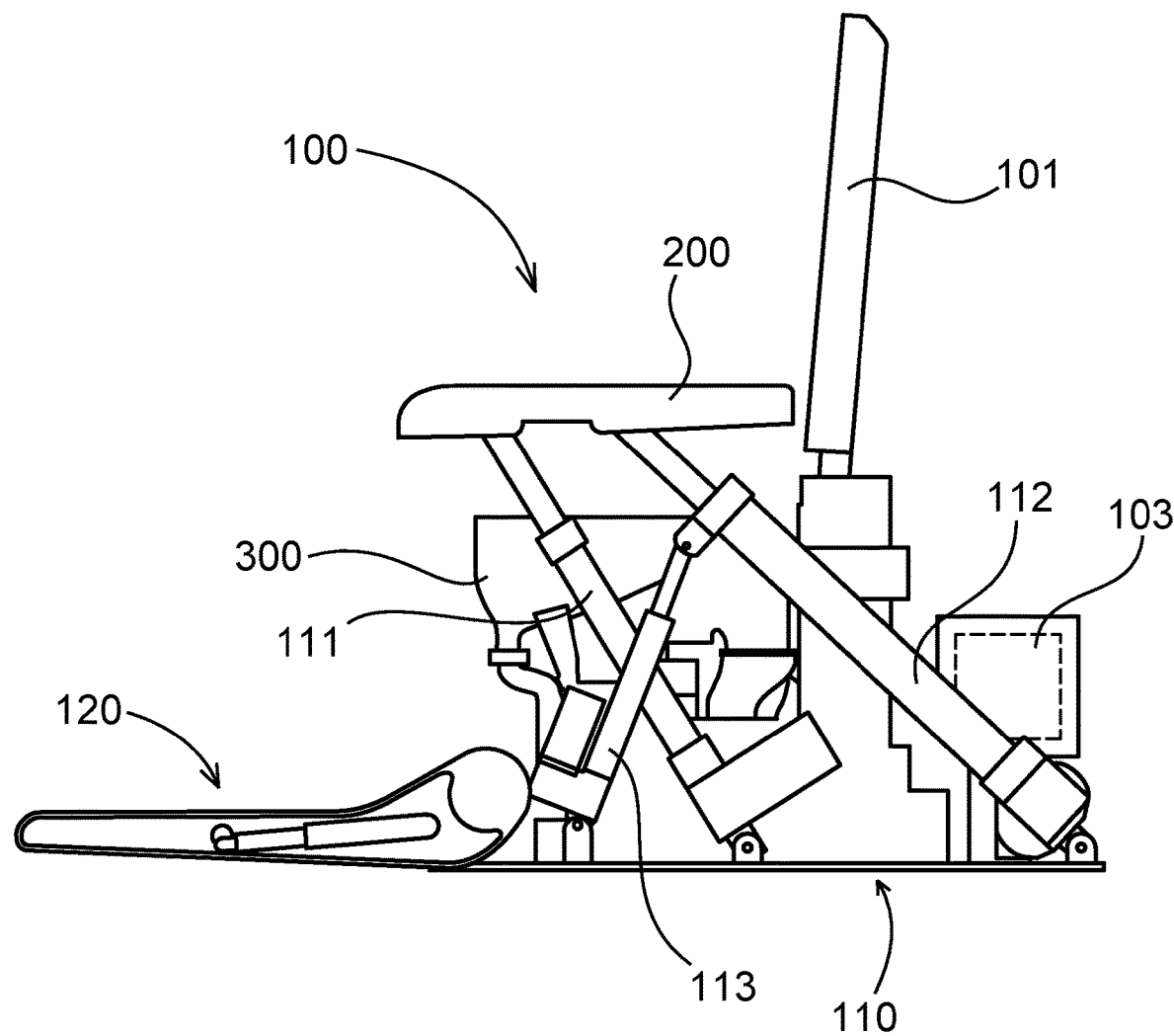
FIG. 4 is a side plan view of the toilet of FIG. 3 with the seat raised to a higher sitting position.
Figure 5:
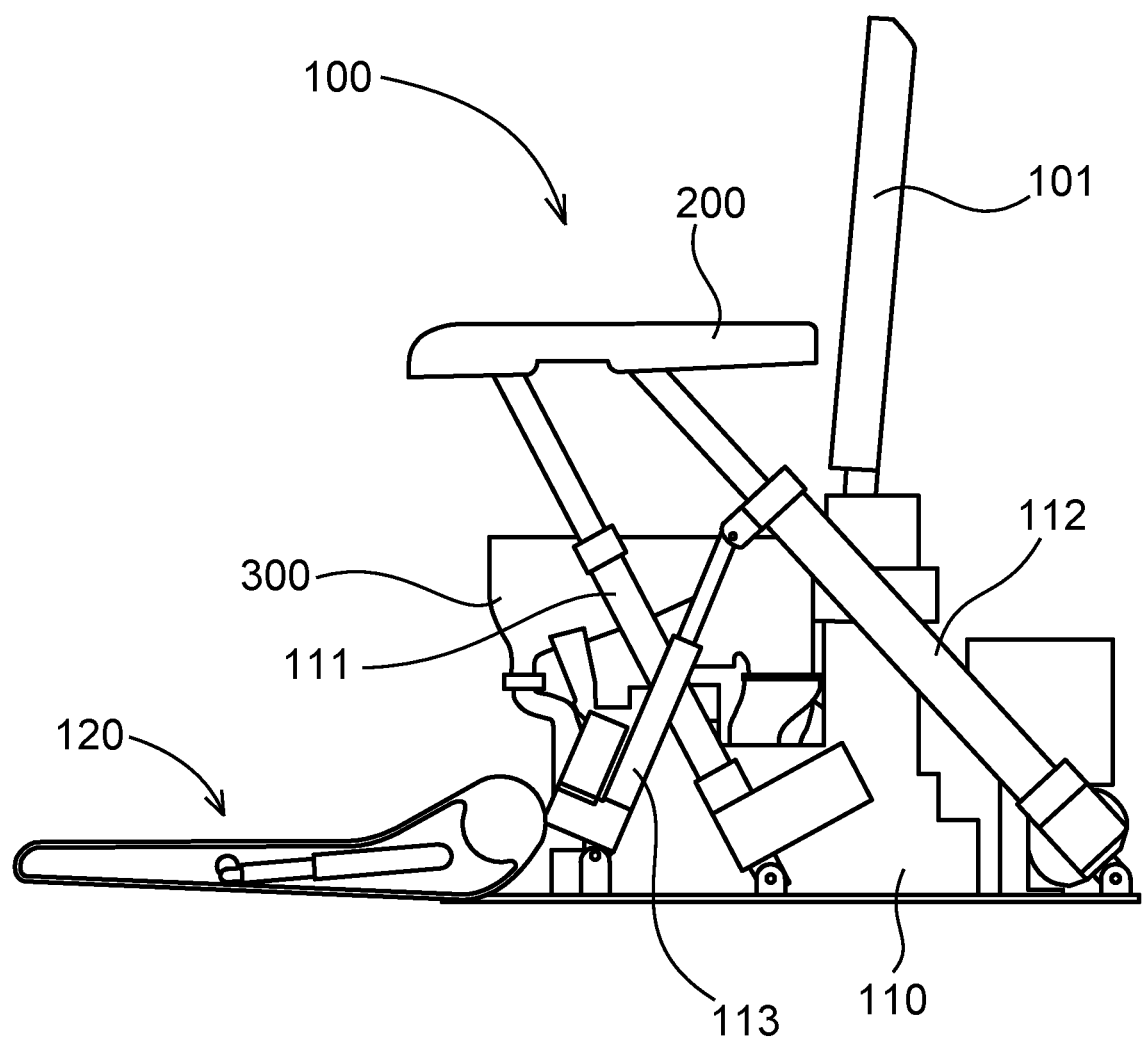
FIG. 5 is a side plan view of the toilet of FIG. 3 with the seat raised to a still higher sitting position.
Figure 6:
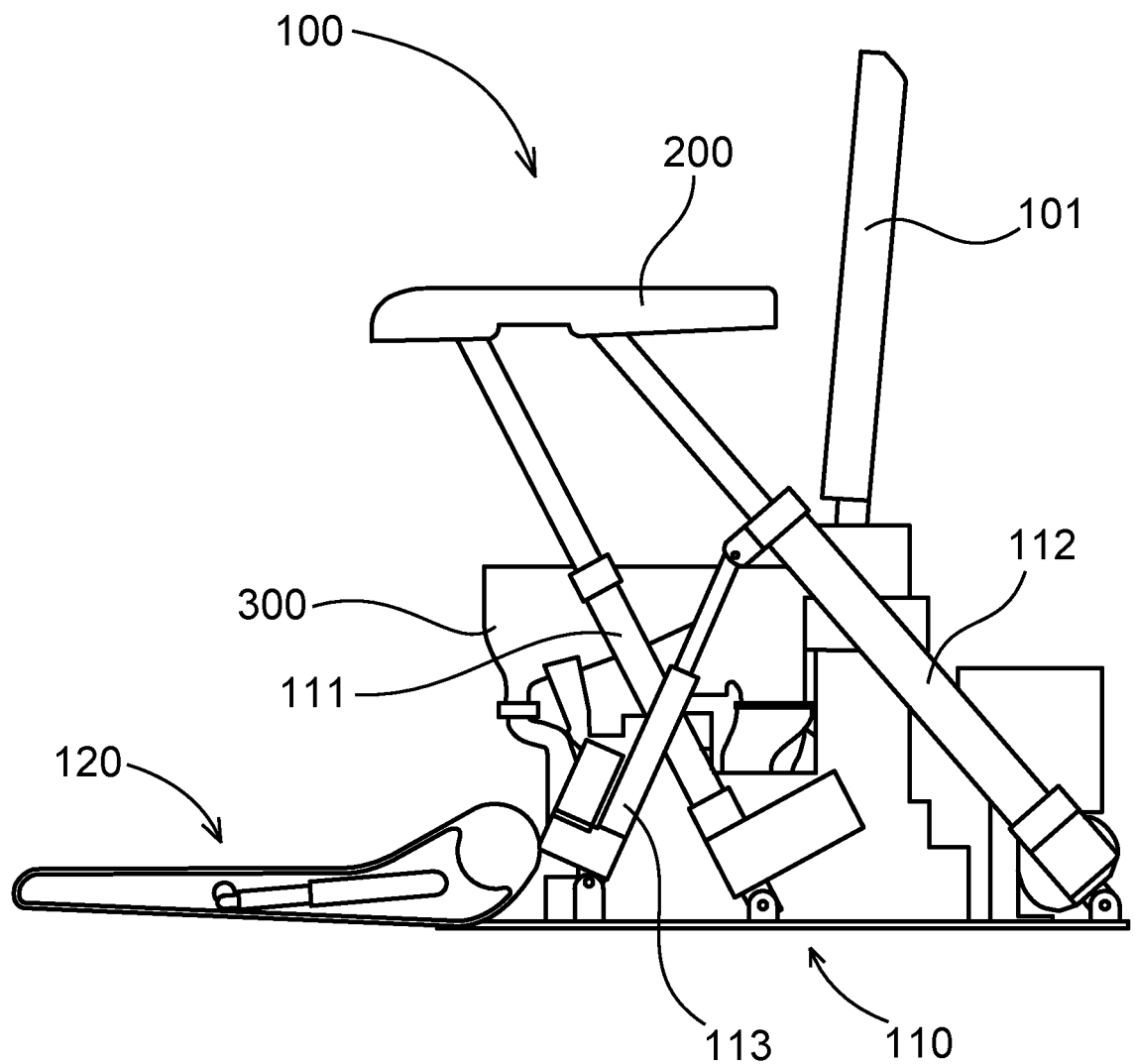
FIG. 6 is a side plan view of the toilet of FIG. 3 with the seat raised to a highest sitting position.

FIG. 3 shows the toilet 100 with the seat 200 fully lowered to just above the top of the bowl 300. In FIG. 4, the first actuators 111, second actuators 112, and third actuators 113 have elevated the seat 200 to a greater height while maintaining its position directly above the bowl 300. FIG. 5 shows the toilet 100 with the seat 200 more elevated. FIG. 6 shows the seat 200 at a greater height.

In various exemplary embodiments, the use of multiple 111, 112, and 113 actuators for the seat 200 control provide the ability to move the seat 200 with much greater control and precision than previous external seat lift systems. By using multiple actuators 111, 112, and 113 with multiple lift points, it is possible to lift and lower in different directions and at different speeds at different points on the seat.

Figure 7:
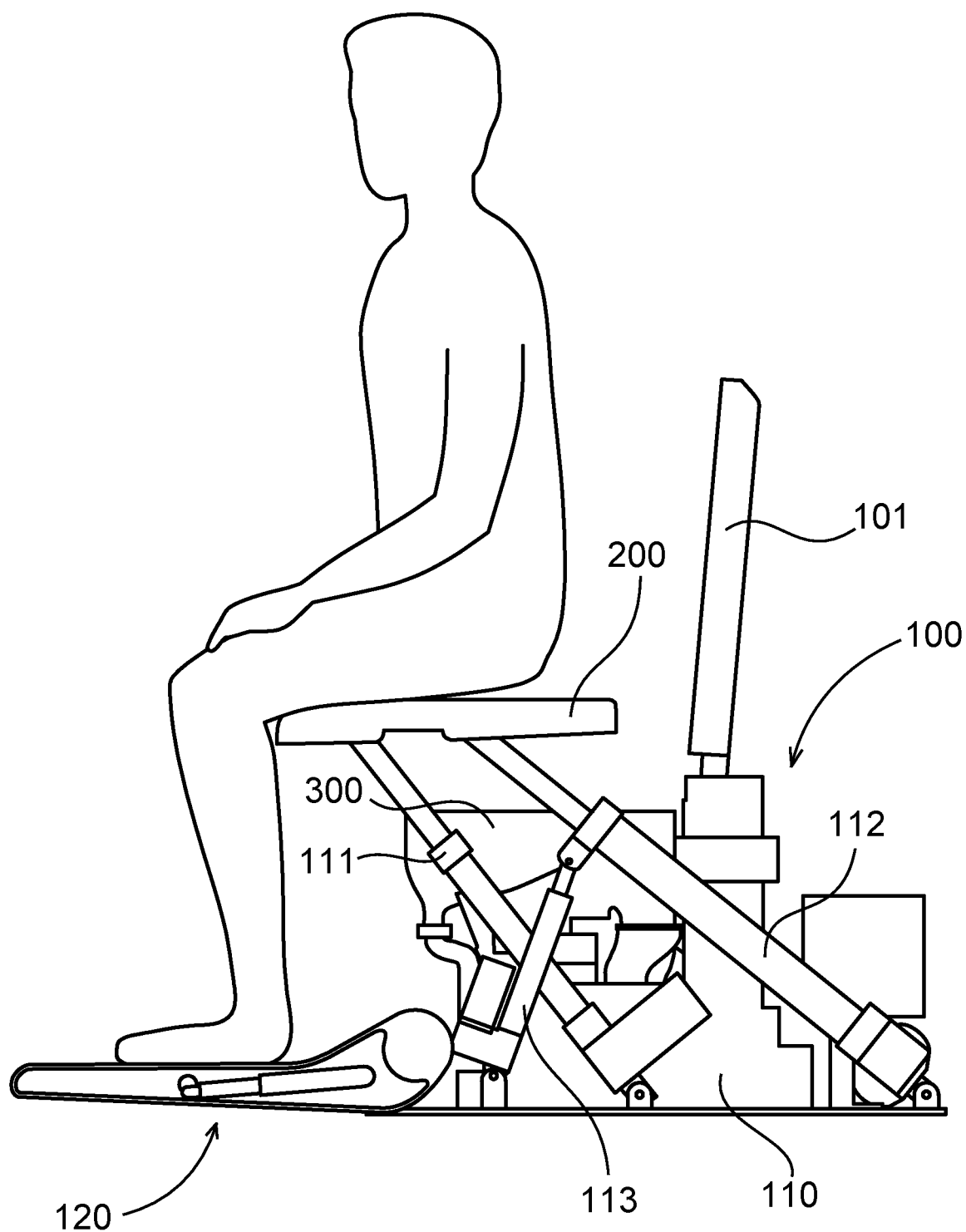
FIG. 7 is a side plan view of the toilet of FIG. 3 with the seat slightly raised and moved forward as the seat begins lifting an occupant to their feet.
Figure 8:
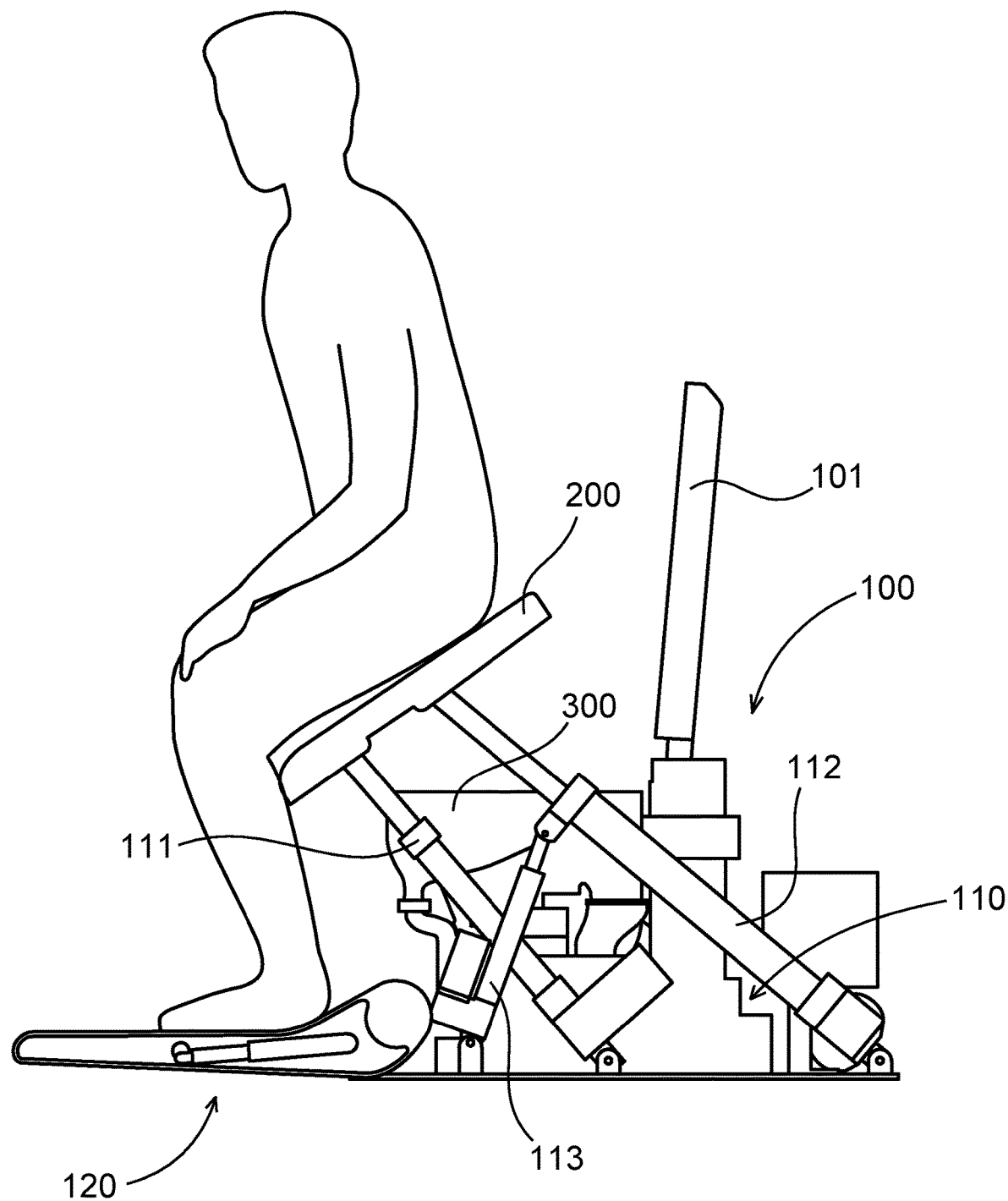
FIG. 8 is a side plan view of the toilet of FIG. 3 with the seat tilting forward in the process of lifting an occupant to their feet.
Figure 9:
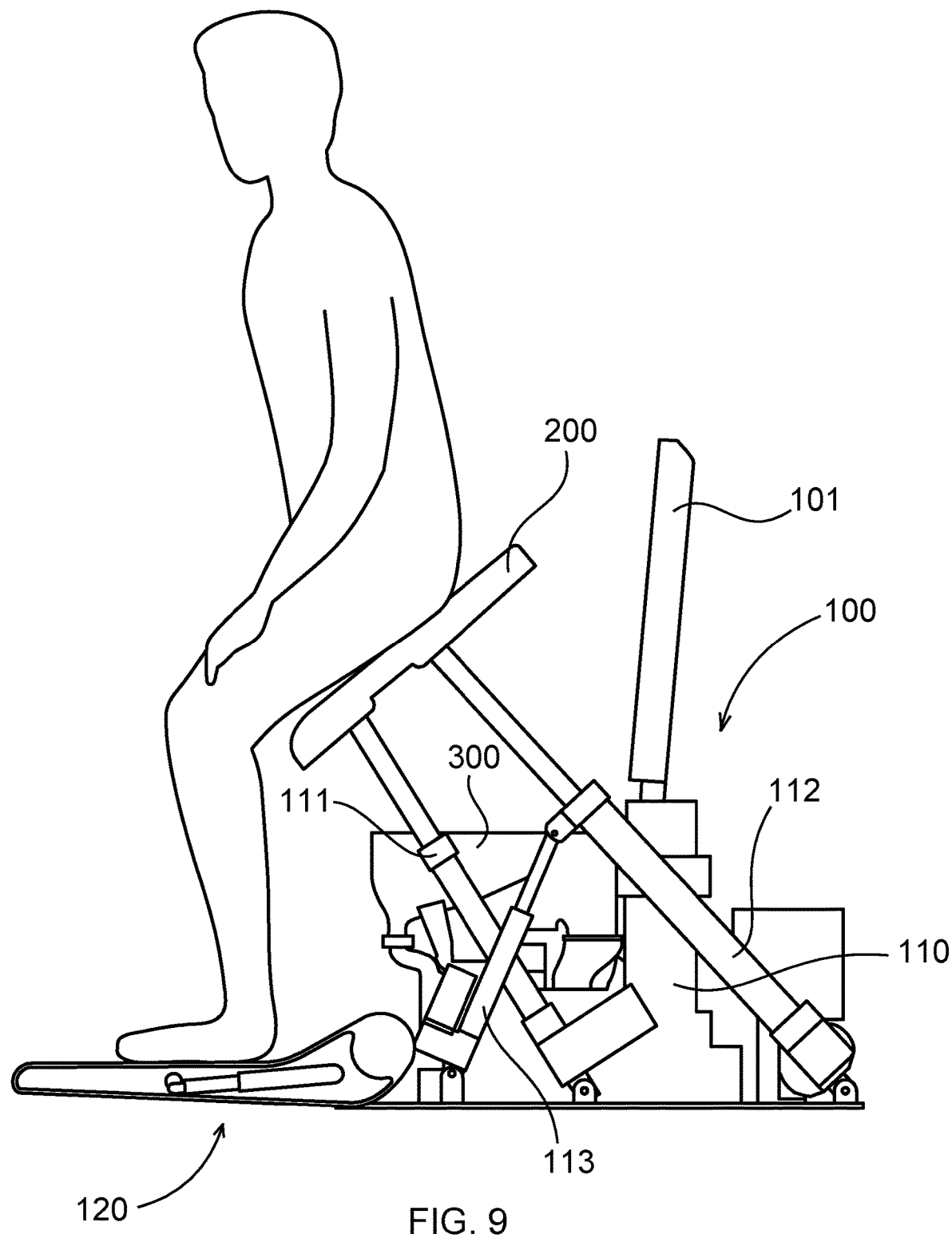
FIG. 9 is a side plan view of the toilet of FIG. 3 with the seat tilting slightly more in the process of lifting an occupant to their feet.
Figure 10:
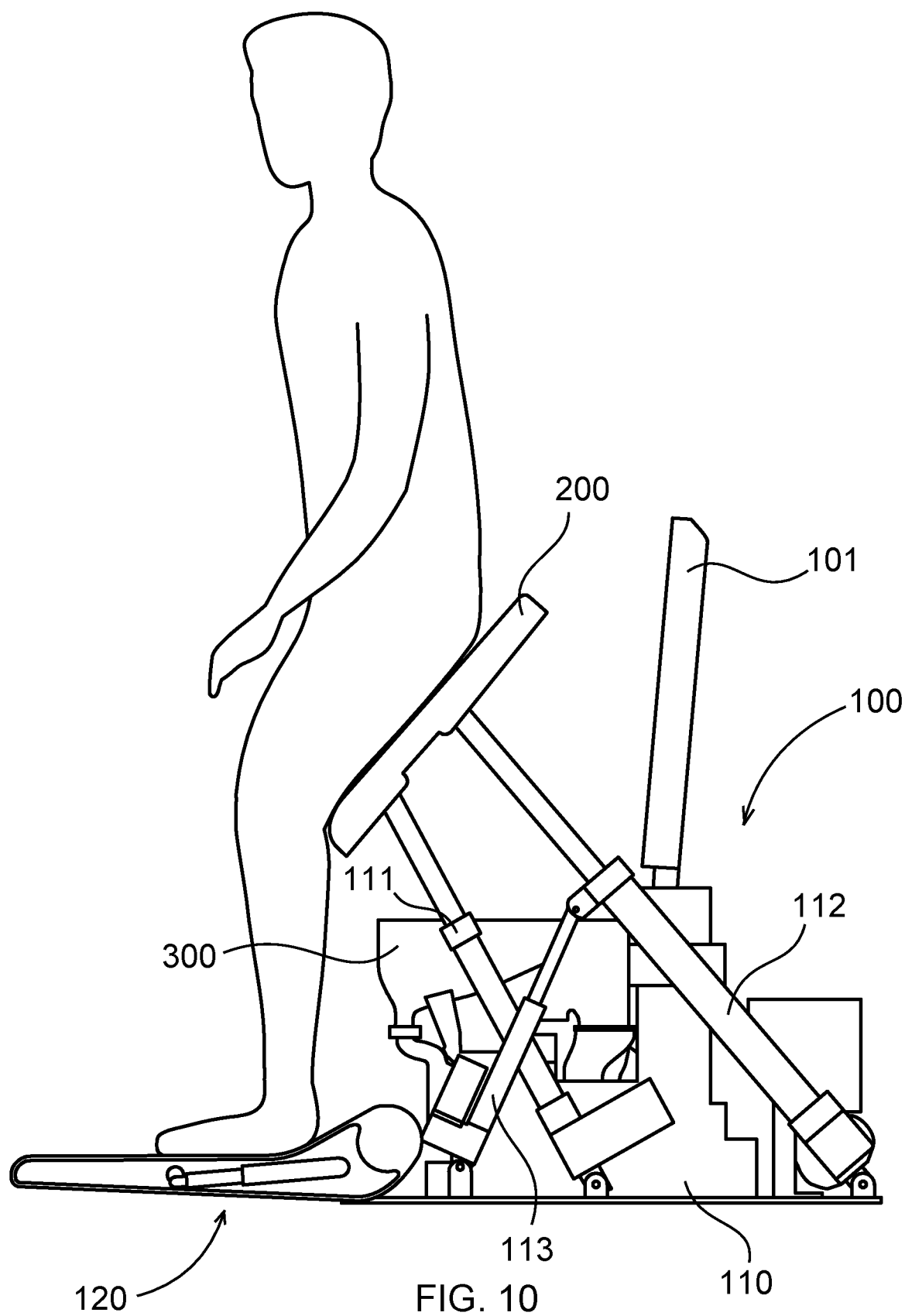
FIG. 10 is a side plan view of the toilet of FIG. 3 with the seat slightly raised and moved forward in the process of lifting an occupant to their feet.
Figure 11:
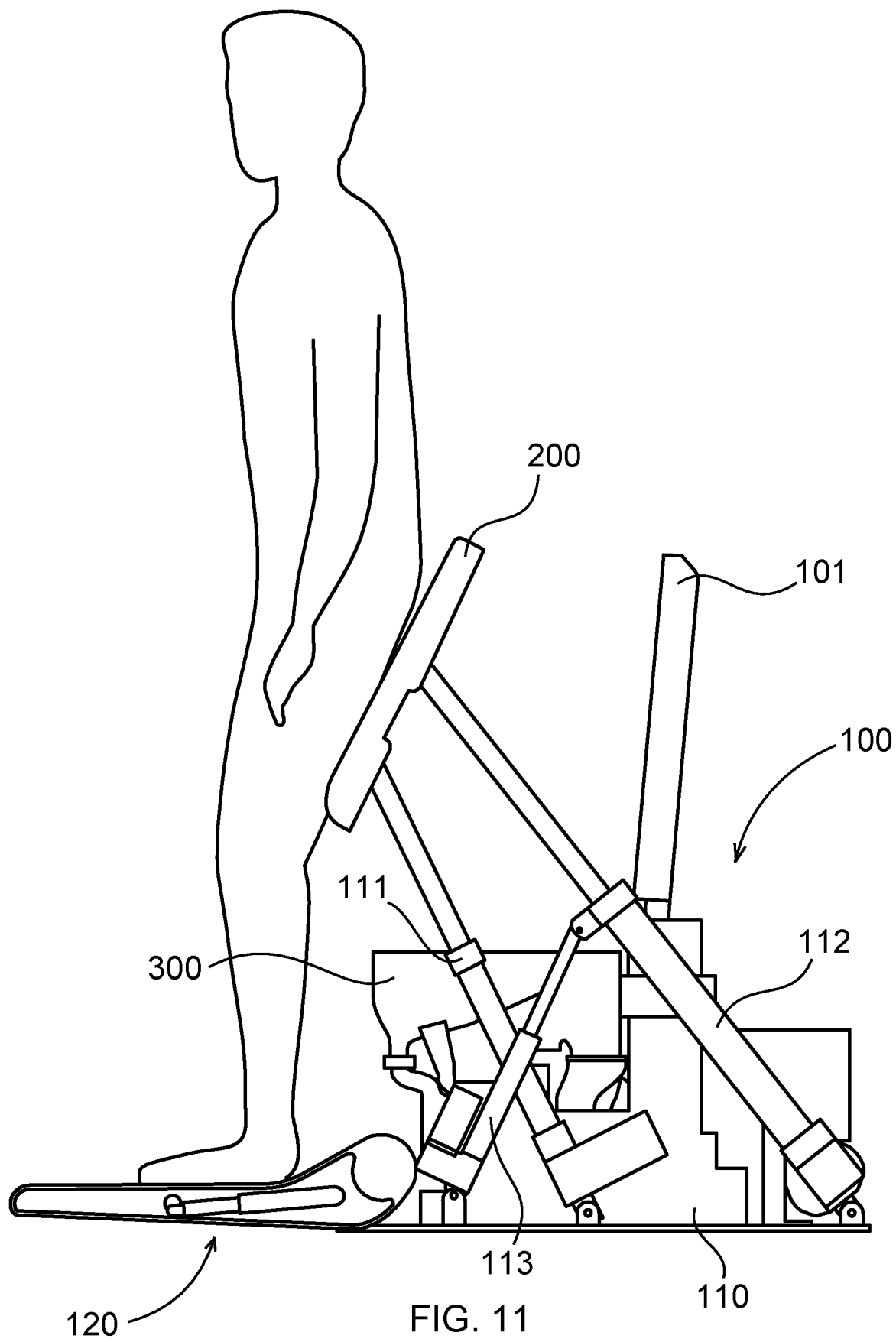
FIG. 11 is a side plan view of the toilet of FIG. 3 with the seat further raised and moved forward to finish the process of lifting an occupant to their feet.

Referring to FIGS. 7 to 11, an exemplary embodiment of a toilet 100 is shown being used to assist a user by lifting them to their feet. In FIG. 7, the seat 200 has been elevated and moved away forwards from the bowl. In FIG. 8, the back of the seat 200 has been elevated relative to the front shifting the occupant's weight more towards their own legs and feet. In FIG. 9, the elevation and angle has increased lifting the user more upright and onto their feet. In FIG. 10, the angle of the seat 200 has increased again straightening the user's legs and shifting more weight onto the user's feet. In FIG. 11, the seat 200 angle is nearly perpendicular to its original position and the user is almost completely upright and on their feet. In various exemplary embodiments, the process can be reversed to assist a user to sit down.

In various exemplary embodiments, the toilet 100 also includes a foot platform 120 with a foot lift mechanism. The platform 120 may be used to provide foot support for shorter users or to elevate the user's legs to a more ergonomically optimal position for defecation (i.e., a "squatty potty"). The "squatty potty" position could also be achieved by lowering the bowl 300 and/or seat 200. The toilet 100 may include weight sensors to detect the user's weight on the platform 120 and move from an optimal position for initially sitting down to another position optimal for passing excreta.

Figure 12:
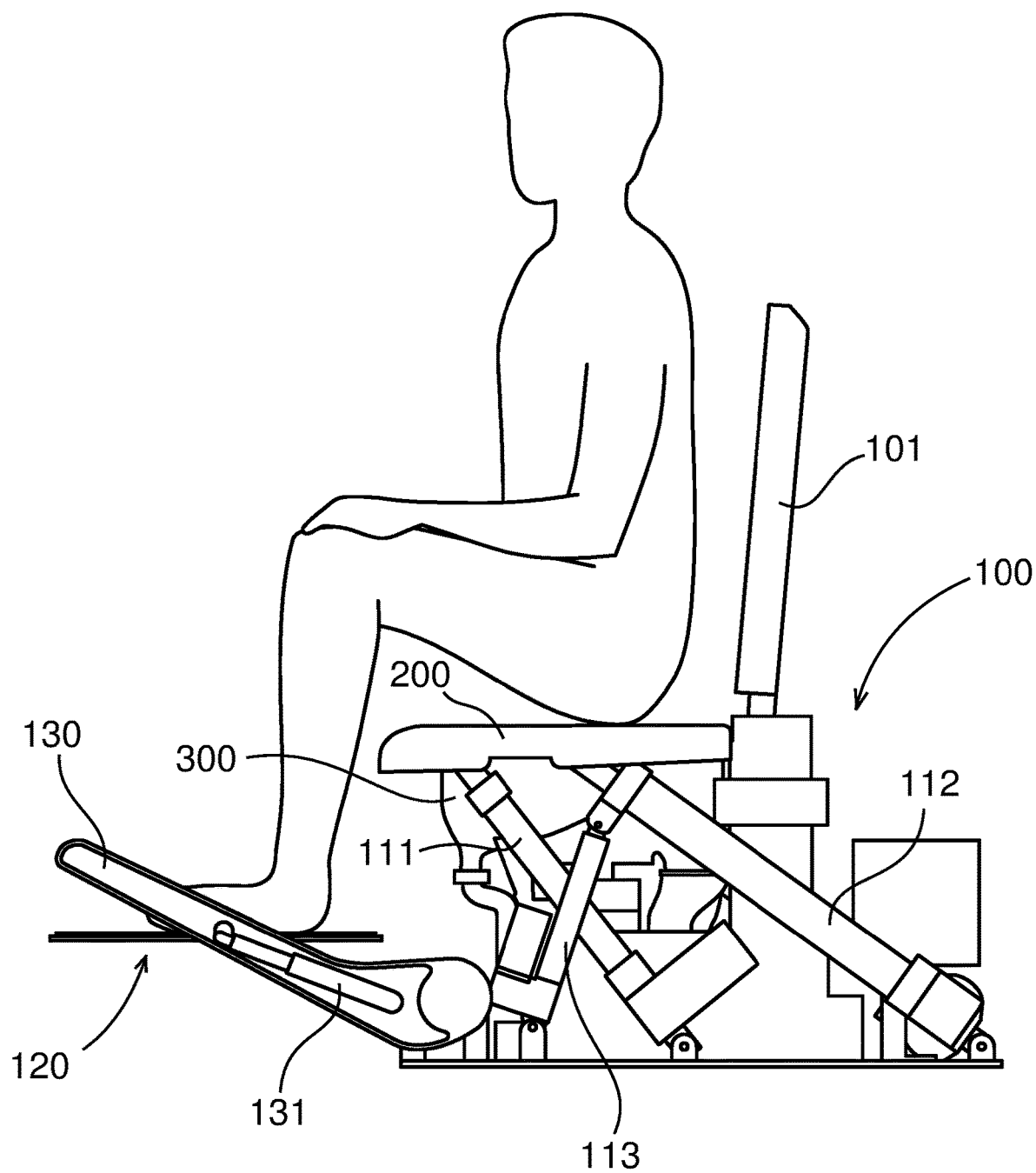
FIG. 12 is a side plan view of the toilet of FIG. 3 with the foot platform elevated above the floor.
Figure 16A:
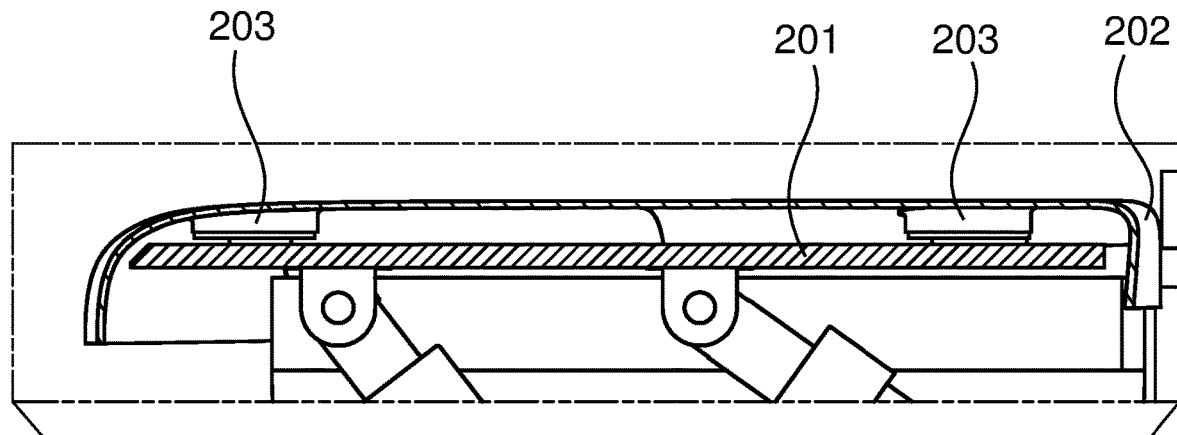
FIG. 16A is close-up view of the seat as shown in FIG. 16.
Figure 16:
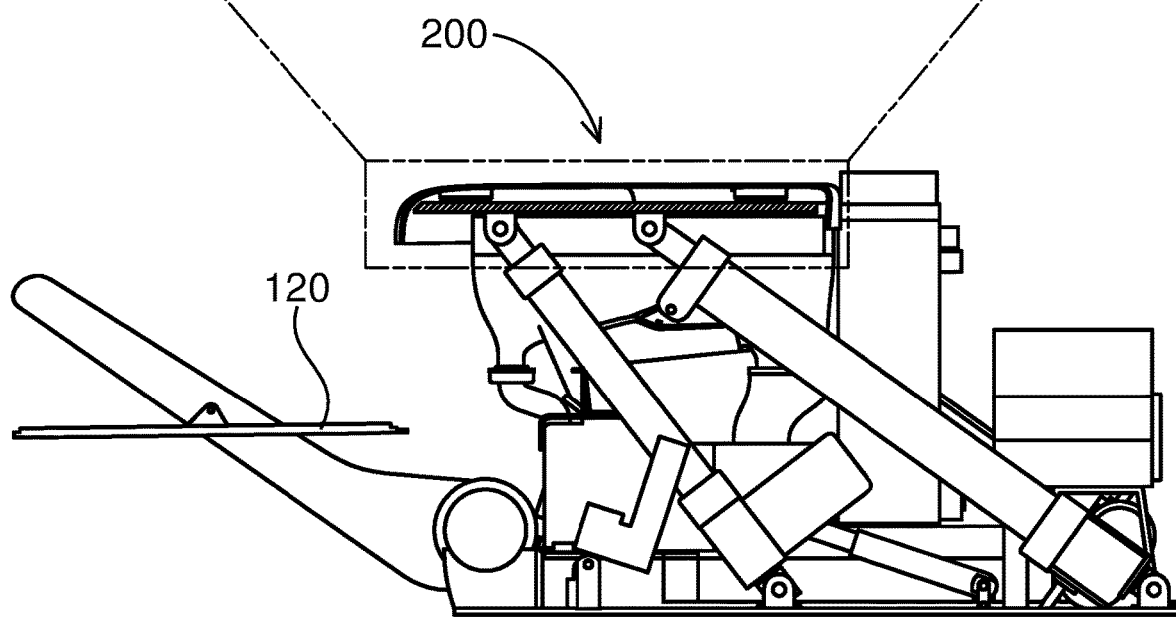
FIG. 16 is a side cross-sectional view of the toilet of FIG. 1.

Referring to FIG. 12, the toilet 100 is shown with the foot platform 120 raised (see also FIG. 16). In various exemplary embodiments, the platform 120 is raised and lowered by pivoting arms 130 using planetary gears (not shown). The angle of the foot platform 120 relative to the arms 130 is adjusted to keep the foot platform 120 by actuators 131.

Figure 13:
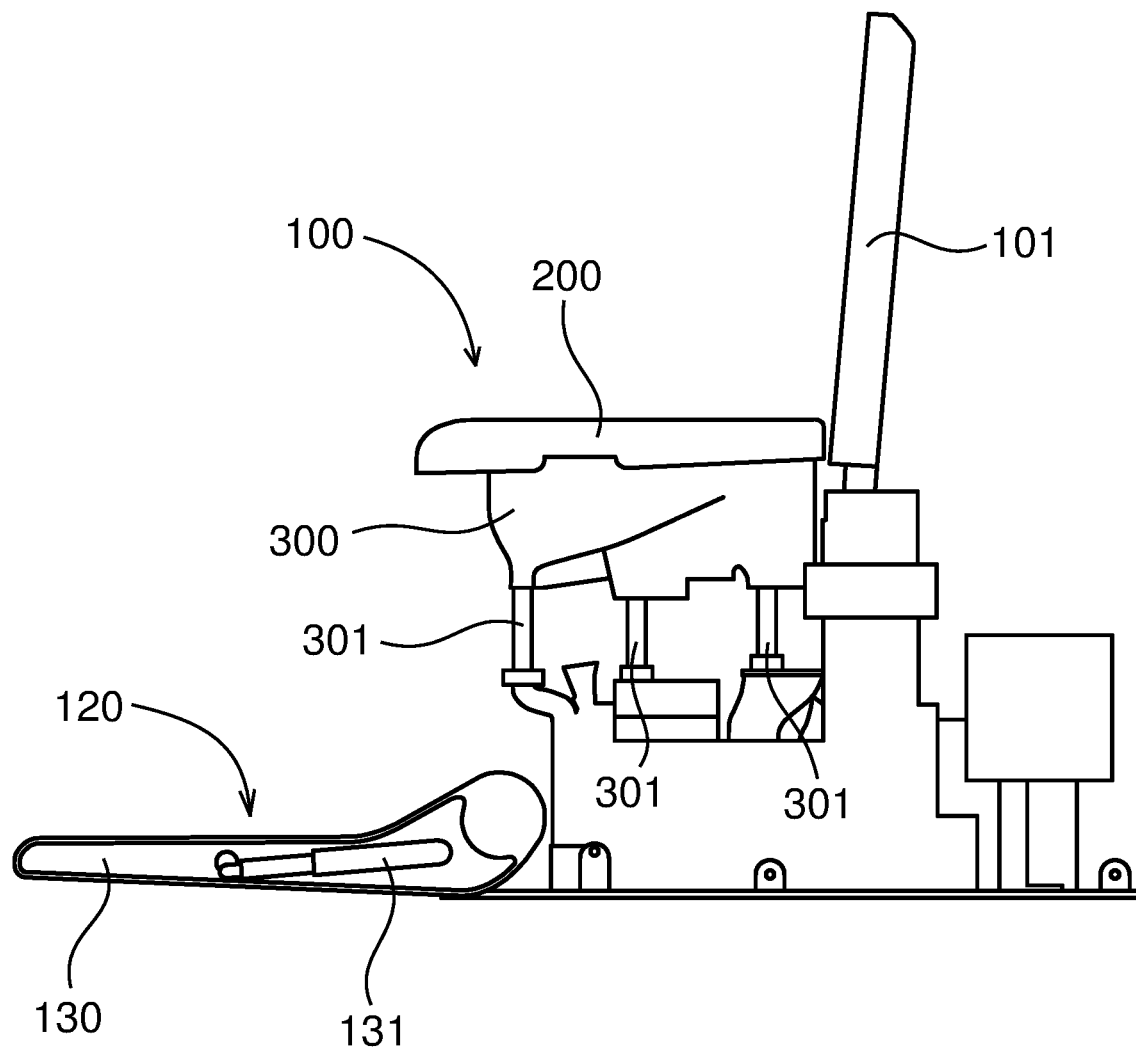
FIG. 13 is a side plan view of the toilet of FIG. 3 with the bowl raised (seat lifting actuators removed for better viewing).

Referring to FIG. 13, a bowl lift mechanism is used to elevate the bowl that includes at least one actuator 301. In preferred embodiments, the shroud 400 adapts to changes to the position of the bowl. In such an embodiment, the bowl may remain in fluid connection with the drain or may be closed off until it is lowered again. In some embodiments, the toilet may be lowered into the floor to create more space for the toilet's internal components. In preferred embodiments, the shroud 400 is made from an elastic material that stretches and contracts back into its original shape. In various exemplary embodiments, the bowl 300 floats on weight sensors 302 which makes it possible to weigh excreta in the bowl.

Figure 14:
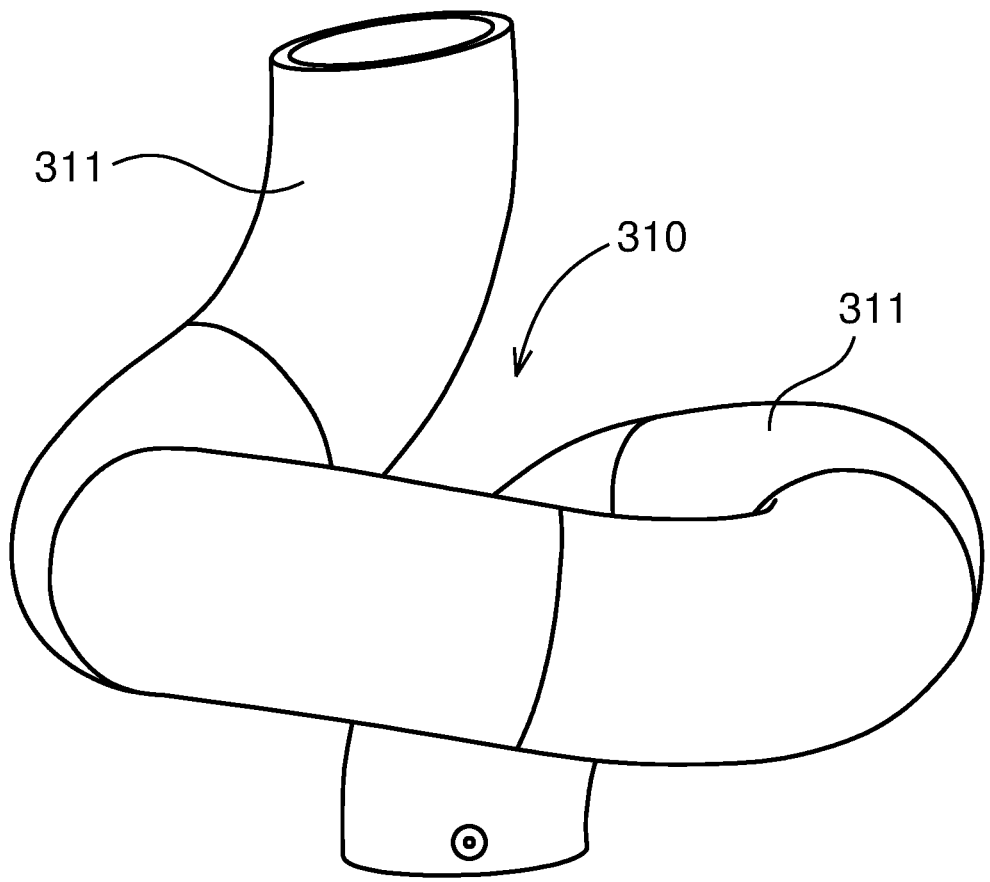
FIG. 14 is a perspective view of an exemplary embodiment of an adjustable piping system according to the present disclosure in a lowered or compacted position.
Figure 15:
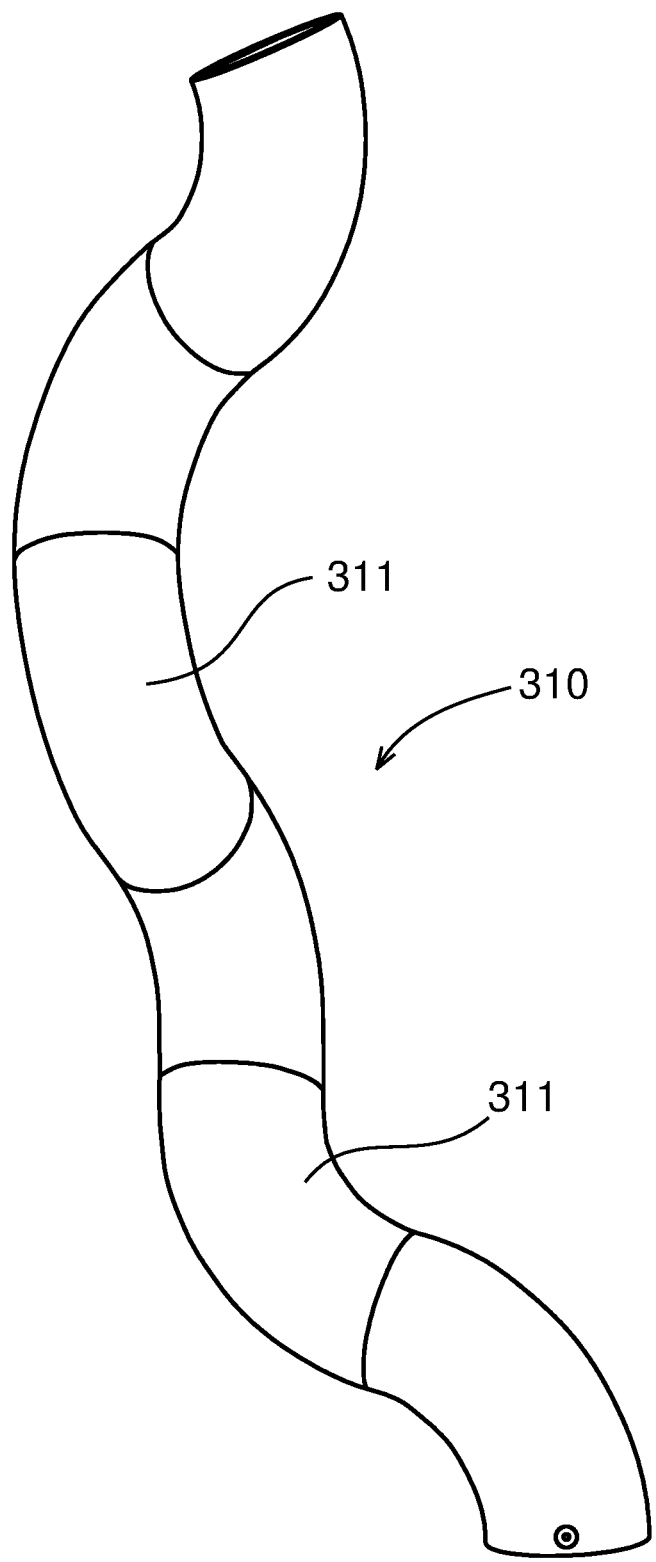
FIG. 15 is a perspective view of the piping of FIG. 14 in an extended or raised.

Referring to FIG. 14, an exemplary embodiment of a flexible tube 310 is illustrated in a lowered position. It is made of a series of rotatably connected "macaroni" shaped tubes 311. FIG. 15 shows the same tubing 310 in a raised position. The act of raising and lowering the bowl 300 with the plumbing attached could act as the flushing action. When the bowl 300 is lifted the tube 310 is straighter and empties everything into the sewer. When it lowers, it creates the standard p-trap with excess tube. The sections of tube 311 shaped like the "macaroni" could also be motorized at the joints and comprise at least part of the bowl lift mechanism.

Referring to FIGS. 16 and 16A, an exemplary embodiment of a floating toilet seat 200 according to the present disclosure is shown. The seat includes a rigid seat support 201 covered by a shroud 202. Weight sensors 203 are placed between the seat support 201 and floating cover 202. In various other embodiments, the weight sensors may be placed in a variety of places such as under the actuators or under the frame.

In various exemplary embodiments, the seat shroud 202 is supported by a plurality of weight sensors 203. In a preferred embodiment, four weight sensors 203 are placed at about the four corners of the seat 200. In various exemplary embodiments, the total weight on the seat 200 is calculated by adding the weights detected by each individual weight sensor 203. In various exemplary embodiments, the weight distribution across the seat 200 (e.g., left side vs. right side or front vs. back) is monitored and calculated by adding weights from different subsets of sensors 203. An unequal distribution of weight between the left buttock and right buttock, as evidenced by an unequal distribution of weight across the weight sensors 121, may indicate that the user's stance on the seat is not stable. A consistent unequal distribution may also indicate an injury or weakness in the buttock bearing less of the user's weight.

Figure 17:
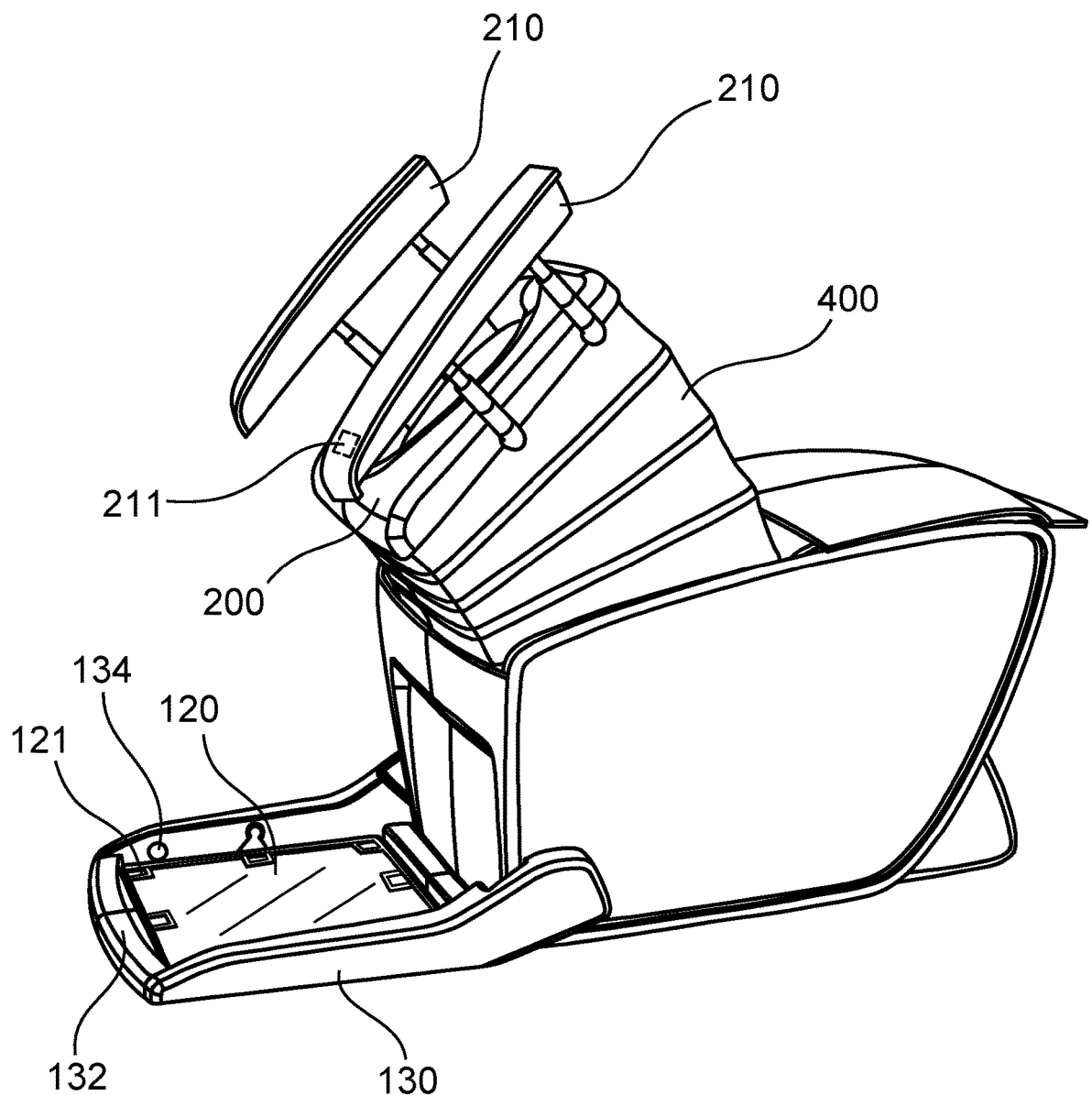
FIG. 17 is a perspective view of the toilet of FIG. 1 with the seat in a raised position and the shroud expanded to accommodate the movement of the seat.

Referring to FIG. 17, the seat 200 is shown in a raised position such as during lifting or lowering a user. The portion of the shroud 400 that covers the lift mechanism expands or stretches as the seat is raised and lowered. In preferred embodiments, the shroud 400 is made from an elastic material that stretches and contracts back into its original shape.

In various exemplary embodiments, the frame 110 and seat lift are internal to the toilet 100 rather than an external add-on. It also creates a customizable lifting motion set to a person's preferences. This means that the toilet 100 can look and feel mostly like a normal toilet 100, but it also can help prevent falls by keeping a person more supported during a lift and help them to their feet at an appropriate height.

Figure 18:
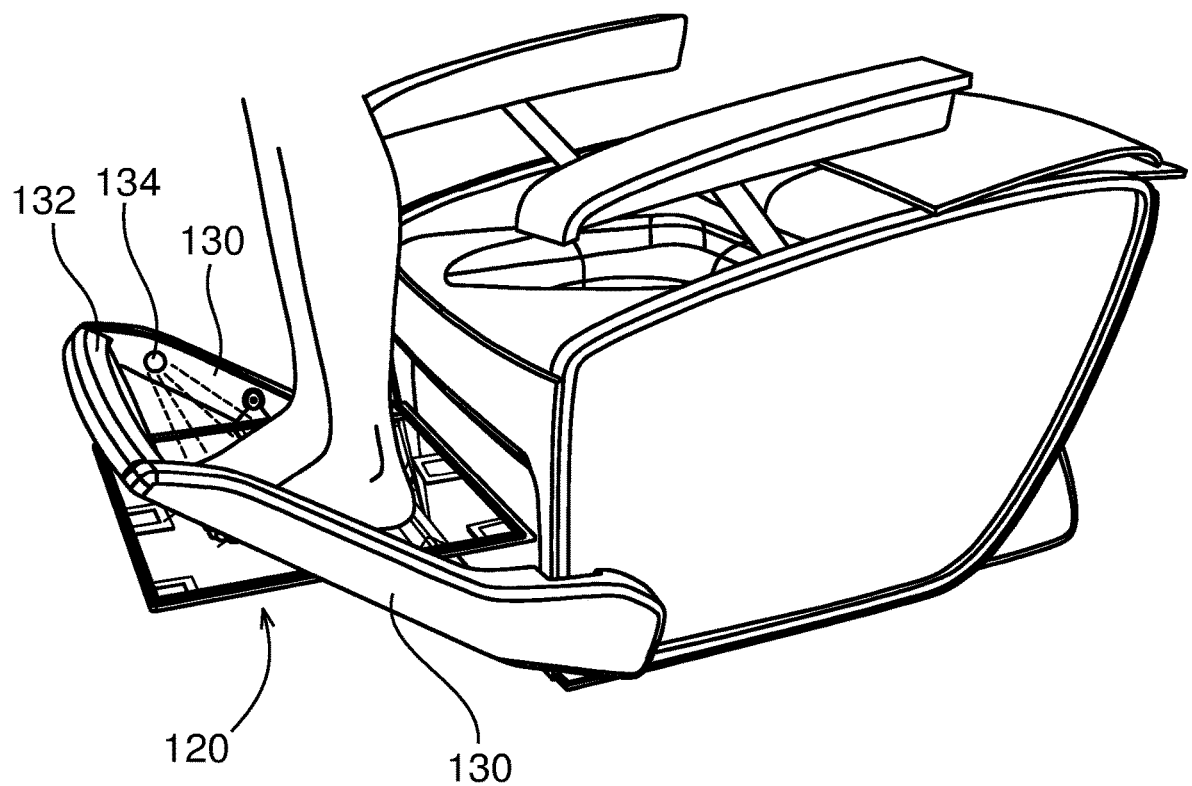
FIG. 18 is a perspective view of the toilet of FIG. 1.
Figure 19:
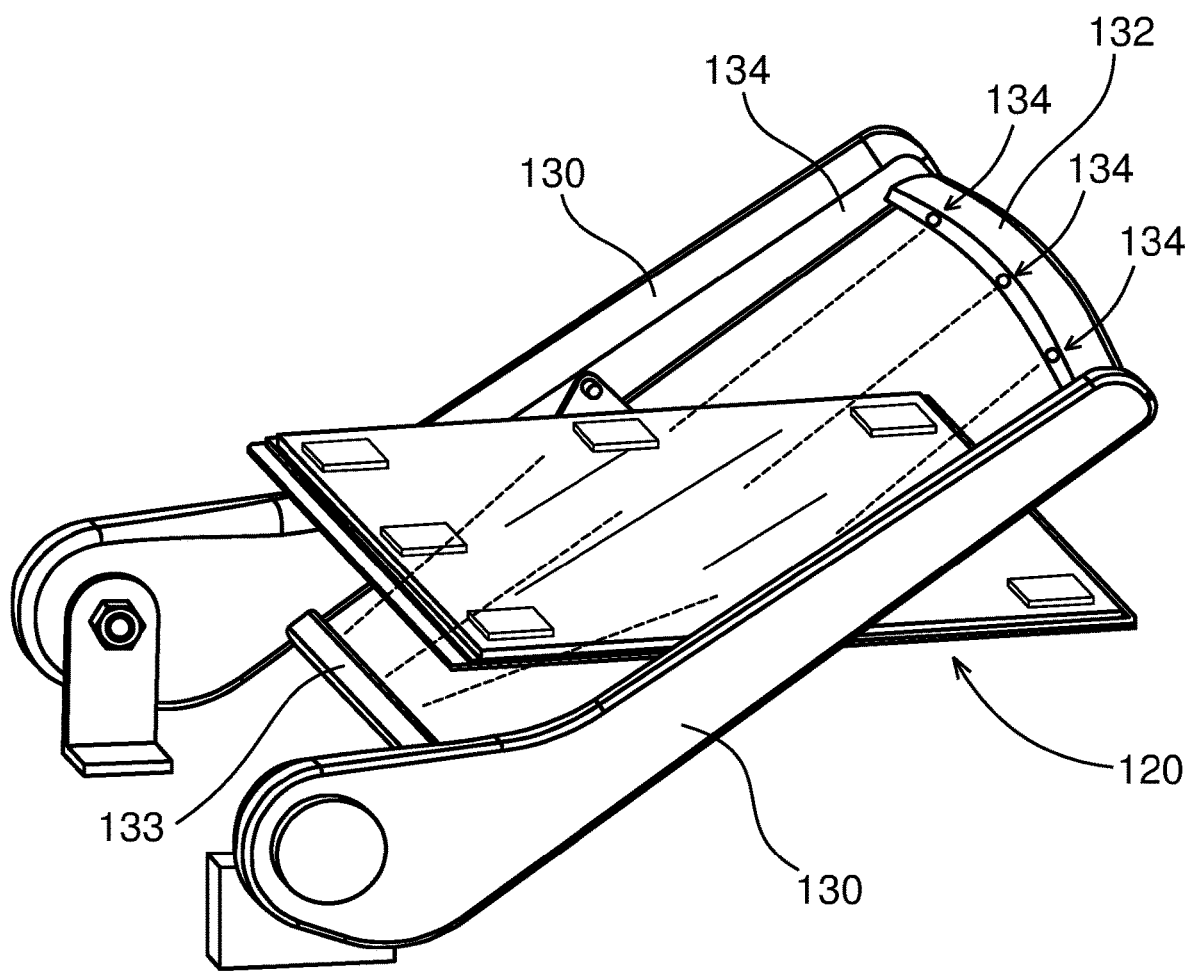
FIG. 19 is a perspective view of the foot platform of the toilet of FIG. 1.

Referring to FIGS. 18-19, an exemplary embodiment of a toilet foot platform 120 according to the present disclosure is shown. The foot platform 120 includes weight sensors 121 placed under the foot platform 120 between in and the structure supporting it.

In various exemplary embodiments, the toilet continuously measures weight load on both the seat 200 and the foot platform 120. In a preferred embodiment, the system weighs the user on the foot platform 120 prior to the user placing any weight against the seat 200 and records that as the user's total weight. In some embodiments, the system calculates a user total weight using the seat weight sensors 203, foot platform weight sensors 121, and armrest weight sensors after the user seated with the seat 200 fully lowered. In various exemplary embodiments, the system calculates the percentage of user body weight on the foot platform 120. The angle of the seat 200 is limited from raising based on the percentage of weight on the foot platform 120. This prevents the seat 200 from tipping to an angle that will not support the user's weight prior to the user being on their feet.

Referring still to FIGS. 18-19, the foot platform 120 is adapted to provide for imaging sensors 134 to examine a user's feet. Imaging sensors 134 are positioned above, to the sides, and below the user's feet on the arms 130, crossbar 132, and base 133. The imaging sensors 134 may be visible light, infrared, near infrared, thermal, and/or 3D sensors. A foot platform and imaging sensors of this type are described in U.S. patent application Ser. No. 16/578,118 filed on Sep. 20, 2019, which is incorporated herein by reference in its entirety.

Figure 20:
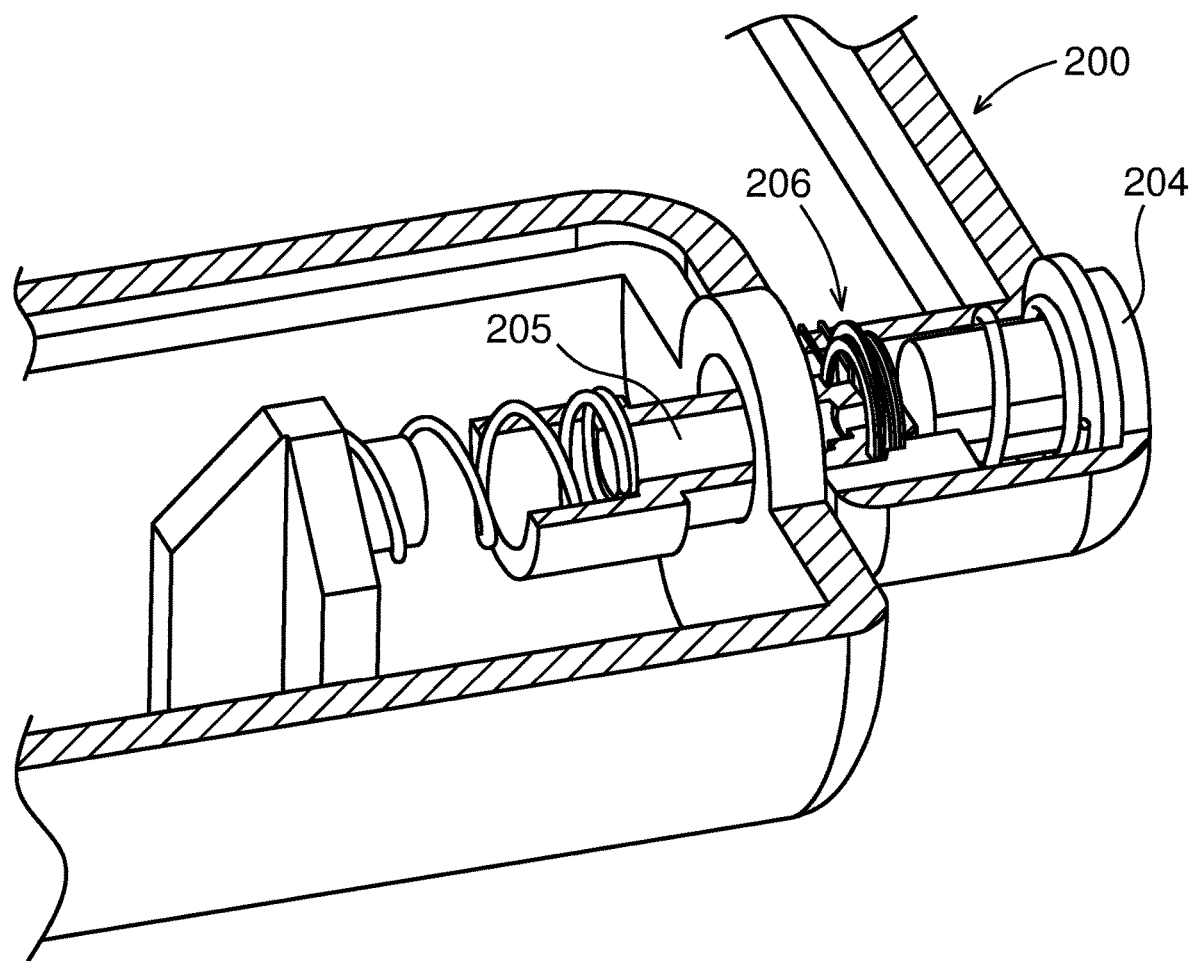
FIG. 20 is a partial perspective view of a powered quick disconnect for a toilet seat according to the present disclosure.

In accordance with the present disclosure, a design for a seat 200 that can be easily added/removed from a toilet, seat topper, seat lifter, etc. is provided. This allows for easier installation of a new seat 200 to accommodate upgraded seats and/or seat sensors. Referring to FIG. 20, a powered quick disconnect mechanism is shown. The seat 200 is removed by pressing in on the spring-loaded button 204. This moves the spring-loaded axle 205 out of the seat to allow the seat 200 to be removed. The electrical connector 206 automatically connects and disconnects with physical connection. The electrical connector 206 comprises a ring connector that maintains electrical connection throughout the seat's range of motion. This provides for electrical power and/or data connections to sensors in the seat.

In various exemplary embodiments, the bowl 300 floats on weight sensors which makes it possible to weigh excreta in the bowl 300. In such embodiments, the bowl 300 does not support the seat 200, lid 101, or any other components of the toilet 100. In a preferred embodiment, the weight sensors 302 are located between the bowl actuators 301 (see FIG. 13) and the bowl 300 but may be located anywhere in the bowl support system (e.g., under the bowl actuators 301).

In various exemplary embodiments, the foot platform 120 is supported by a plurality of weight sensors 121. In one embodiment, the foot platform has a generally rectangular (or square) shape and is supported by weight sensors 121 placed at about the four corners of the foot platform 120. In a more preferred embodiment, four additional weight sensors 121 are located along the edges of the foot platform 120 at midpoints between the corners. In other embodiments, additional weight sensors 121 may be placed at other locations not limited to being adjacent to the edges of the foot platform 120.

In various exemplary embodiments, the total weight on the foot platform 120 is calculated by adding the weights detected by each individual weight sensor 121. In various exemplary embodiments, the weight distribution across the foot platform 120 (e.g., left side vs. right side or front vs. back) is monitored and calculated by adding weights from different subsets of sensors 121. An unequal distribution of weight between the left foot and right foot, as evidenced by an unequal distribution of weight across the weight sensors 121, may indicate that the user's stance on their feet is not stable. A consistent unequal distribution may also indicate an injury or weakness in the foot or leg bearing less of the user's weight. The system can also detect a person teetering or wobbling back and forth.

In various exemplary embodiments, a default position for the bowl and/or seat may be selected by the user. In such embodiments, the system will return to this position after being used by someone with a different preferred or optimal position. In various exemplary embodiments, the smart toilet may be programmed with separate default configurations for children and adults.

Preferably, the actuators are controlled by a digital controller 103 that coordinates the actions of the actuators to thereby provide a smooth lifting and lower at the desired speed. More preferably, the controller 103 is programmable, so that users can program the lifting and lowering of the seat to their preference. Even more preferably, the toilet includes a user identification module, so that the user is automatically identified as he or she approaches or sits on the toilet.

In accordance with the present disclosure, a smart toilet that includes mechanical, hydraulic, power, and data connections to accommodate a combination of health measuring tools is provided. An electrical connection to provide power to the health measuring tools is also provided.

In various exemplary embodiments, the smart toilet includes at least one imaging sensor that captures and analyzes at least one image of a user. A processor analyzes the image data to attempt to compare the user to known users for identification purposes. If a known user is identified, the position of the bowl and/or seat is automatically adjusted to the preferred position of the user. If the user is unknown or does not have a record preferred position, the processor analyzes the physical characteristics of the user (e.g., height, waist height, length of upper and lower legs) and adjusts the position of the bowl and/or seat accordingly. In some embodiments, facial recognition is used to identify users.

In various preferred embodiments, the system may identify a user based on their face, hand, or foot. In various preferred embodiments, the image sensor includes a 3D camera. The 3D camera can be used to create an image of the user's body. With proper calibration, such as taking the image at a known distance, the length of major bones may be calculated and used to customize the toiler position for an unknown user.

In various exemplary embodiments, the toilet system includes sensors for measuring the user's weight. This includes separate sensors for determining user weight on the seat and user weight on the user's feet. The user's weight that is supported by their feet is preferably measured using a platform adjacent to the toilet on which the user's feet are placed while sitting and while being lowered or raised from the toilet.

In the preferred embodiments, the toilet also includes health assessment devices supported by the frame. Examples of such devices include imaging cameras, flow spectrometers, volume measurement devices, body weight sensors, and gas analyzers. Toilets with such devices are described in the patents and published applications cited in the Background section above.

In various exemplary embodiments, the seat and bowl may be lifted together such that the toilet may be used as a urinal. In such a configuration, the system may be designed to flush with a reduced volume of water.

All patents, published patent applications, and other publications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A toilet comprising:
   a frame comprising a base and a lift mechanism, the lift mechanism comprising:
   at least one first seat actuator attached to the frame and to the front area of a seat;
   at least one second seat actuator attached to the frame and to the back area of the seat; and
   at least one third seat actuator attached to the at least one second seat actuator and to the frame;
   wherein the actuators are adapted to raise, lower, and change the angle of the seat;
   a bowl supported by the frame;
   a seat also supported by the frame;
   a shroud covering the frame;
   a foot platform positioned to support the feet of a user sitting on the seat wherein the foot platform comprises a plurality of foot platform weight sensors;
   a plurality of seat weight sensors between the frame and the seat for measuring the weight of a user on the seat; and
   a controller receiving data from the plurality of foot platform weight sensors and from the plurality of seat weight sensors;
   wherein the controller uses the data from the foot platform weight sensors to calculate the weight distribution of the user between the seat and foot platform; and
   wherein the controller uses the data from the foot platform weight sensors to calculate the weight distribution of the user between the left and right side of the foot platform; and
   wherein the controller uses the calculated weight distributions to control the at least one lift mechanism.

2. The toilet of claim 1 wherein the controller uses the data from the seat weight sensors to calculate the weight distribution of the user between the left and right side of the seat and uses the calculated weight distribution to control the angle of the seat.

3. The toilet of claim 1 wherein the at least one first seat actuator, at least one second seat actuator, and at least one third seat actuator each operate independent of each other.

4. The toilet of claim 1 wherein the controller controls the angle of the seat based on the calculated weight distributions.

5. The toilet of claim 1 wherein the actuators are configured to be housed within the shroud.

6. The toilet of claim 1 wherein the lift mechanism is adapted to change the angle of the seat.

7. The toilet of claim 1 wherein the plurality of weight sensor in the foot platform further comprises weight sensors under the foot platform.

8. The toilet of claim 7 wherein the plurality of weight sensor further comprises one or more weight sensor located under the edges of the foot platform.

9. The toilet of claim 1 wherein the frame further comprises a seat support frame.

10. The toilet of claim 9 wherein the plurality of weight sensor in the frame further comprises one or more weight sensors placed between the seat support frame and the seat.

11. The toilet of claim 1 further comprising at least one actuator for raising and lowering the foot platform.

12. The toilet of claim 1 further comprising a control system for the user to indicate readiness to change position between seated and standing.

13. The toilet of claim 1 wherein the foot platform further comprises a platform lifting mechanism.

14. The toilet of claim 1 wherein the controller is programmed to the preferences of multiple users.

15. The toilet of claim 1 wherein the shroud comprises a flexible material that adapts as the configuration of the toilet is altered by adjusting the position of the bowl or seat.

16. The toilet of claim 1 further comprising handles for the user to grasp for support during lifting or lowering.

17. The toilet of claim 16 wherein the handles further comprise sensors for detecting the gripping force of the user's hands on the handle.

\* \* \* \* \*